US006815702B2

(12) United States Patent
Kiermeier et al.

(10) Patent No.: US 6,815,702 B2
(45) Date of Patent: Nov. 9, 2004

(54) METHOD AND APPARATUS FOR DETECTION OF AN EDGE OF A PRINTING PLATE MOUNTED ON A DRUM IMAGING SYSTEM

(75) Inventors: Arnfried Kiermeier, Groton, MA (US); Norman F. Rolfe, Carlisle, MA (US)

(73) Assignee: Agfa Corporation, Wilmington, MA (US)

( * ) Notice: Subject to any disclaimer, the term of this patent is extended or adjusted under 35 U.S.C. 154(b) by 166 days.

(21) Appl. No.: 10/004,093

(22) Filed: Oct. 23, 2001

(65) Prior Publication Data

US 2003/0075696 A1 Apr. 24, 2003

(51) Int. Cl.[7] .................................................. G01V 8/00

(52) U.S. Cl. .................. 250/559.36; 250/202; 250/234; 347/262; 271/258.01; 101/477; 101/486

(58) Field of Search ............................ 250/559.36, 202, 250/216, 234–236; 347/262–264; 271/230, 258.01; 101/477, 401.1, 463.1, 467, 485, 486, DIG. 36, 415.1

(56) References Cited

U.S. PATENT DOCUMENTS

| | | | | |
|---|---|---|---|---|
| 4,687,943 A | * | 8/1987 | Bowen et al. | 250/570 |
| 4,876,456 A | | 10/1989 | Isono et al. | |
| 4,976,545 A | * | 12/1990 | Kipphan et al. | 356/446 |
| 5,046,159 A | * | 9/1991 | Hamanaka | 355/1 |
| 5,889,547 A | | 3/1999 | Rombult et al. | |
| 5,992,325 A | * | 11/1999 | Schumann et al. | 101/477 |
| 6,097,475 A | | 8/2000 | Jakul et al. | |
| 6,130,702 A | * | 10/2000 | Ganton | 347/264 |
| 6,469,808 B1 | * | 10/2002 | Onishi et al. | 358/475 |

* cited by examiner

*Primary Examiner*—Thanh X. Luu
*Assistant Examiner*—Stephen Yam
(74) *Attorney, Agent, or Firm*—J. Grant Houston; Robert A. Sabourin; J.oseph D. King

(57) ABSTRACT

A method and apparatus is disclosed to precisely locate an edge of an imageable plate mounted on a drum or other support surface. A light source and light sensor are used to measure the difference in reflectivity between the plate and the support surface. The drum or support surface contains at least one groove to increase the difference in reflectivity between the plate and the support surface. The groove may also contain an anti-reflecting layer to further increase the difference in reflectivity. The groove may also have a geometric shape that causes incident light to be directed away from the light sensor.

4 Claims, 7 Drawing Sheets

*Figure 1*
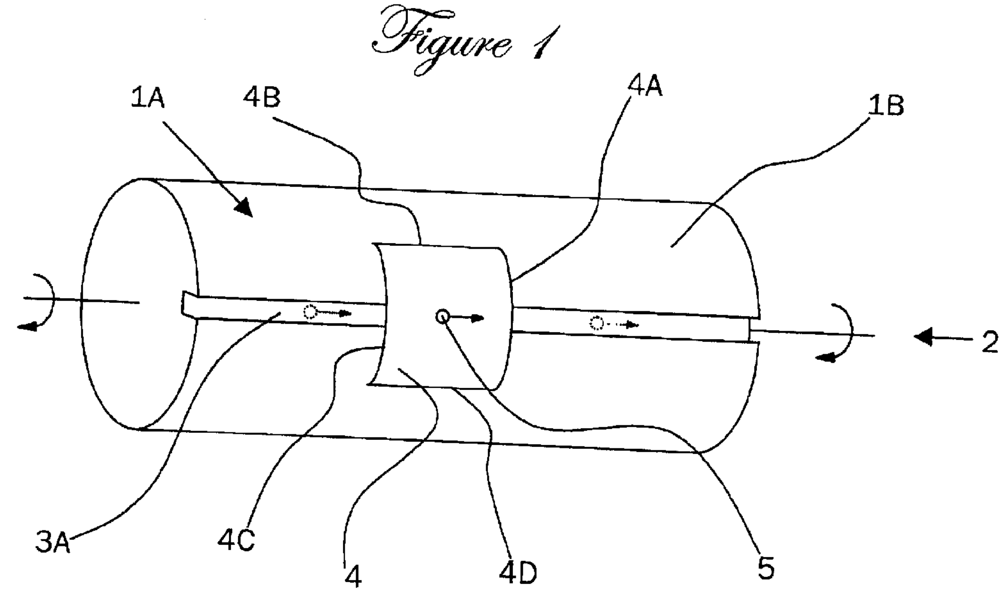
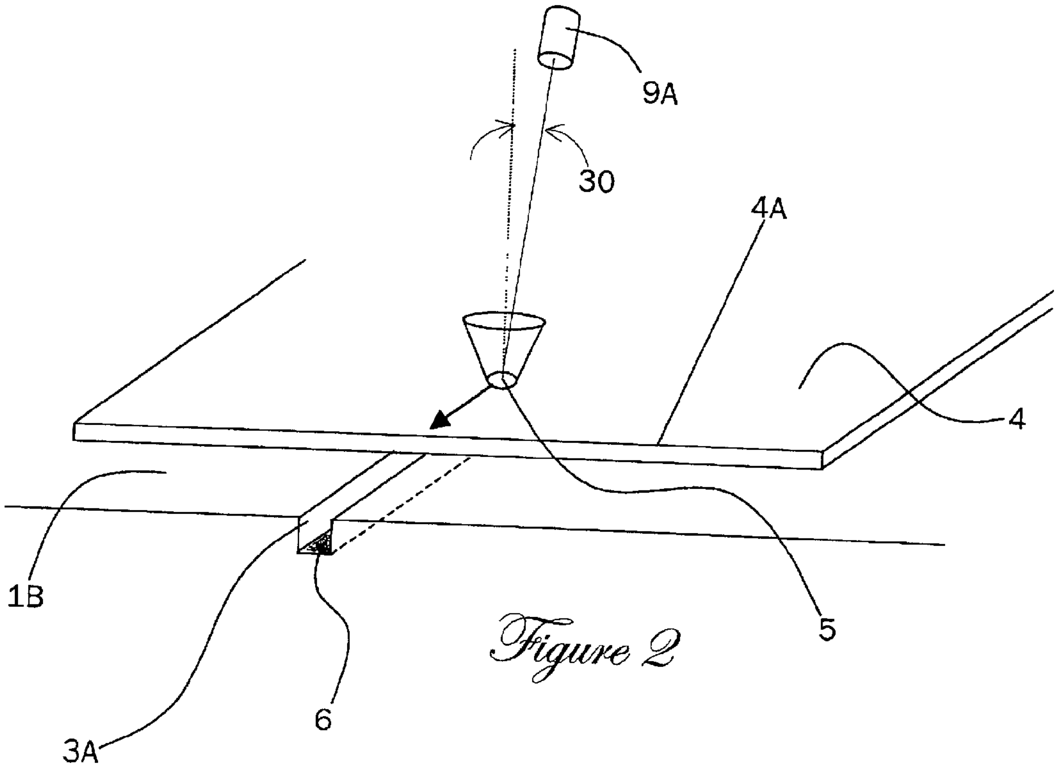
*Figure 2*

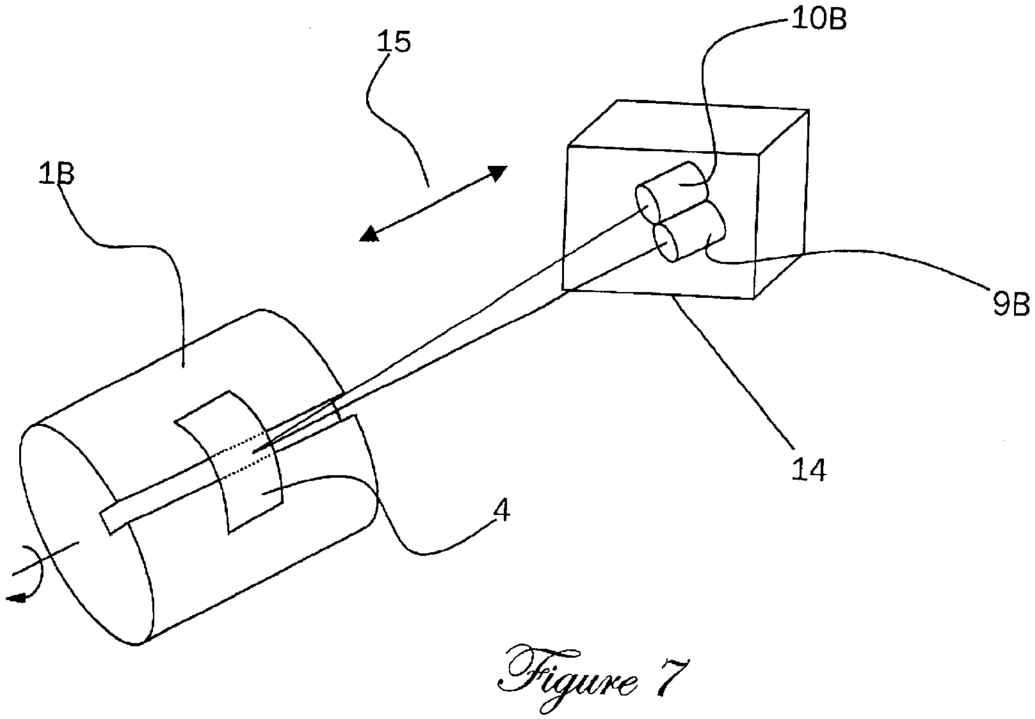
Figure 7
Figure 8
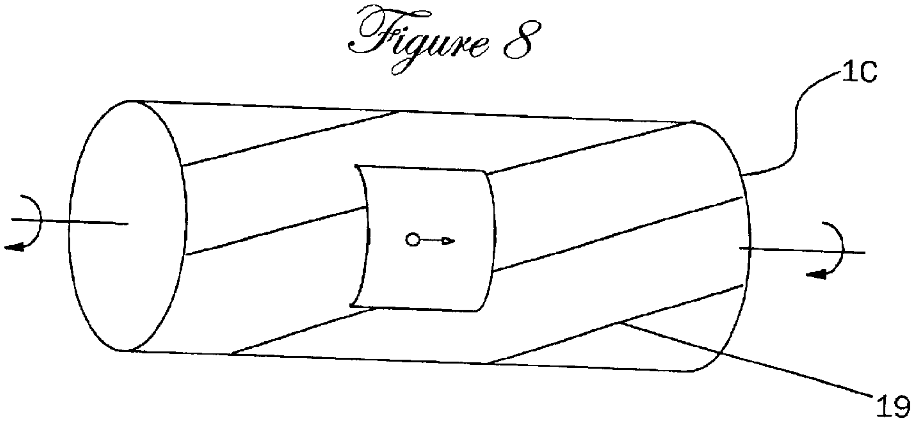

METHOD AND APPARATUS FOR DETECTION OF AN EDGE OF A PRINTING PLATE MOUNTED ON A DRUM IMAGING SYSTEM

BACKGROUND OF THE INVENTION

The invention is in the field of imaging systems for use in the printing industry. More particularly, the invention relates generally to the field of edge detection of imageable printing plates mounted in or on an internal or external drum platesetter used for imaging printing plates. The invention is also suitable for use in an imagesetter used for imaging a film media, which is thereafter used in the process to image a printing plate.

A critical step in a process to transfer an image to a printing plate mounted on a platesetter, for subsequent use on a printing press, is obtaining precise alignment between the image and the plate. An image, e.g. a family portrait, can be skewed if it is not precisely aligned with the outer edges of the printing plate. To prevent skewing, the outer edges of the image should be aligned with the outer edges of the printing plate. Many printing presses have registration pins for installing the plate onto the press. Often the plate has a series of holes punched into it (i.e. a collinear array of holes at each end of the plate) so the plate may be placed over the registration pins on the press. This is done so as to duplicate the same precise alignment of the plate on the printing press as when the plate was exposed to the image on the platesetter. When holes are punched into the plate, precise alignment between the holes and the outer edges of the plate is also required.

An alternate method of installing and aligning (known as registering) plates onto printing equipment e.g. platesetters, printing presses etc. is to simply place an outer edge of a plate up against the registration pins. The outer edges of the plate are then determined by various means and the image area defined with respect to the outer edges of the plate. Alignment errors are directly proportional to how accurately and how precisely edges of the plate can be determined. Various methods are employed to detect an edge of a plate. These methods include mechanical switches, optics, and various other electrical sensing techniques. Each technique has unique disadvantages. For example, mechanical switches cannot detect the edge of a plate with the same resolution that is used to create the image e.g. on the order of pixels. This limits the ability to maximize the available image area of the plate. Further, mechanical edge detection techniques can damage a portion of the plate.

Some optical techniques have been investigated, but can be limited for many reasons. For example, plates can be very thin, often on the order of 0.006 inches thick. This creates a difficult task of measuring the difference in round trip propagation time of a light pulse traveling to the plate and back versus the round trip propagation time of a light pulse traveling to the surface supporting the plate and back. The type of equipment supporting the plate also places limitations on optic techniques. Often the support surface is a metal drum, onto which the plate is mounted. The metal drum, opaque to light, makes an optic transmission method expensive to manufacture. A source must be positioned outside the drum, and a light detector placed in a recess formed in the surface of the drum. This technique is more difficult to implement on a rotating drum.

Reflective methods employed by some workers rely on differences in contrast between different surfaces to reflect varying amounts of light.

Alternatively, attempting to rely on differences in projected focal area between different surfaces to reflect different amounts of light can be difficult. Consider that the amount of light reflected from a surface will vary depending on the size of the light spot (focal area) on the surface. A large spot, with lower light density, reflects less light toward a remote point, than a small spot with higher light density does. A thin plate mounted on a surface produces a very small difference in focal area (spot size) when the spot is on the plate verses the surface. Consequently, the difference in reflected light is very small and difficult to detect.

The difference in reflected light is what makes detecting the edge of a plate possible. Large differences in the amount of reflected light between any two surfaces, simplify, or even eliminate the need for analog signal conditioning circuitry, and allow detection of very small physical discontinuities such as the edge of a thin plate. If the reflectivity between two surfaces is sufficiently different, a large difference in the amount of light reflected from each surface will result even though the physical difference in height is very small, or co-planar. An example is a piece of white paper next to a piece of black paper. The white paper reflects a large amount of light, where the black paper absorbs a large amount of light. Consequently, the black paper reflects less light compared to the white paper. The challenge is obtaining an adequate difference in reflectivity between a plate and a surface that supports the plate. When the difference in reflectivity between two surfaces is very small, e.g. between a black surface and a dark blue surface, it can be very difficult to determine a difference. The tiny difference is "smeared" and even often obscured by noise.

Workers have experimented by coating a surface to reduce reflected light by painting the surface with black paint. This technique may be useful to detect a plate surface, if one is willing to accept the additional complexity to integrate the reflected signals over a period of time. This technique has not worked well to detect the precise edge of a plate. One reason is the very smooth black surface still reflects some light which manifests itself as noise in the light detector. This noise reduces the signal to noise ratio of the electrical signal which is proportional to the difference in reflected light between the plate and the surface. Other factors that contribute to lower Signal/Noise ratios (the difference between a signal and noise) are variations in the 1) reflectivity of printing plates due to different manufacturing processes used by different manufacturers, 2) reflectivity of the drum (or other support surface) due to different surface treatments and debris, 3) reflectivity of the drum (or other support surface) due to surface roughness, and 4) use of thin plates produces little change in light spot size.

A technique for detecting an edge of a printing plate, and any associated skew, is disclosed in co-pending U.S. patent application Ser. No. 09/571,674 by Tice et al, and Ser. No. 09/573,638 by Wolber et al. Tice and Wolber employ a method of making a series of optical transmission measurements using a plurality of light sensors and light detectors. Edge detection sensors according to Tice et al and Wolber et al are not implemented on a drum, but in the loading and/or unloading paths to and from a drum.

An edge detection system employed on a non-rotating internal drum imaging systems is described in U.S. Pat. No. 5,889,547 to Rombult et al, and U.S. Pat. No. 6,097,475 to Jakul. Both patents describe a light detector recessed into an imaging drum for making a transmission measurement. Such a configuration is unsuitable for an external drum imaging system since an external drum rotates and would require slip rings to carry electrical signals to and from the drum.

What is needed, is a method to further reduce the amount of light reflected from an external drum or other support surface.

Further, the mechanical integrity of the edges of the plate must not be compromised and the edges must remain co-planer with the other portions of the plate e.g. not curled up or bowed down. Further, since the plate is often mounted in a stationary position, edge detection apparatus must be capable of moving with respect to the stationary plate.

SUMMARY OF THE INVENTION

It is an object of the invention herein to provide a reliable method and apparatus for precisely detecting an edge of an imageable printing plate or other imageble media mounted on a drum or other support surface of an internal or external drum imagesetter or platesetter.

It is a further object of the invention herein to increase the focal area (spot size) of a light beam by using at least one groove formed into a drum or other support surface where said focal area (spot) is inside of said groove so the amount of light reflected from a surface is reduced.

It is another object of the invention herein to decrease the amount of light reflected from a drum or other support surface using a groove formed into a drum or other support surface where the groove has anti-reflecting (light absorbing) layer deposed on an inside surface of said groove.

It is another object of the invention herein to use a specially shaped groove formed into a support surface of a drum to redirect light originating from a light source away from a light sensor responsive to light from said light source.

It is another object of the invention herein to provide a method for detecting a skewed plate or other imageable media mounted on a support surface of a drum.

BRIEF DESCRIPTION OF THE DRAWINGS

The following description may be further understood with reference to the accompanying drawings in which:

FIG. 1 shows an imageable printing plate mounted on an external drum support surface having a groove illuminated with a light beam in accordance with one embodiment of the invention.

FIG. 2 shows an imageable plate mounted on a support surface of an external drum with an anti-reflective layer deposed on an inside surface of a groove and a light beam traveling along said groove in accordance with the invention.

FIG. 7 shows alternate embodiment of the system of FIG. 4.

FIG. 8 is an alternate embodiment of the system of FIG. 1 showing at least one helical or diagonal groove.

The drawings are shown for illustrative purposes only, and are not to scale.

DESCRIPTION OF THE PREFERRED EMBODIMENTS

The invention described herein is implemented on machines for transferring an electronic image to an imageable media (referred to as imaging) such as a printing plate or film. Two general types of machines are those having a rotatable external drum and those having a non-rotatable internal drum. In both cases, the drums are used to support the media to be imaged. The media is supported on the outside surface in the case of an external drum machine. The media is supported on the inside surface of an internal drum machine. In both cases, a moveable light source is moved with respect to the media in order to image the media.

One embodiment of the invention is generally illustrated in FIG. 1 showing a first anti-reflective (light absorbing) groove 3A formed into a support surface 1B of an external drum 1A. Also shown in FIG. 1 is an imageable plate 4 mounted with edges 4A, 4B, 4C, and 4D, on a surface 1B of external drum 1A. Groove 3A is preferably formed parallel to the longitudinal axis 2 of the drum also known as the axial direction or spin axis of the drum. With groove 3A parallel to drum axis 2, an edge 4A of plate 4 is generally perpendicular to groove 3A when plate 4 is properly mounted. Groove 3A cannot be parallel to and positioned under, edge 4A of plate 4 as edge 4A may sag into groove 3A, or may otherwise be damaged by groove 3A, making precise detection of edge 4A unreliable, and near impossible. Further, groove 3A cannot be too wide for the same reasons supra. For most plates groove 3A is preferably less than about 2 mm wide, with some plates requiring a groove between about 1–1.5 mm. The limit on the minimum width of groove 3A is imposed by the ability to manufacture the narrow groove. The invention herein does not place a limitation on how narrow a groove can be used.

The depth of the groove 3A need be only slightly more than the height of an anti-reflective layer deposed on the inside of the groove. This allows the anti-reflective layer to be completely recessed precluding contact between the plate and the anti-reflective layer. An alternate embodiment includes a groove that may be considerably deeper if an anti-reflective layer is not used, and the shape and/or depth of the groove is used to prevent light from a light source 9A from illuminating a light sensor 10A as disclosed infra.

Figure 4:
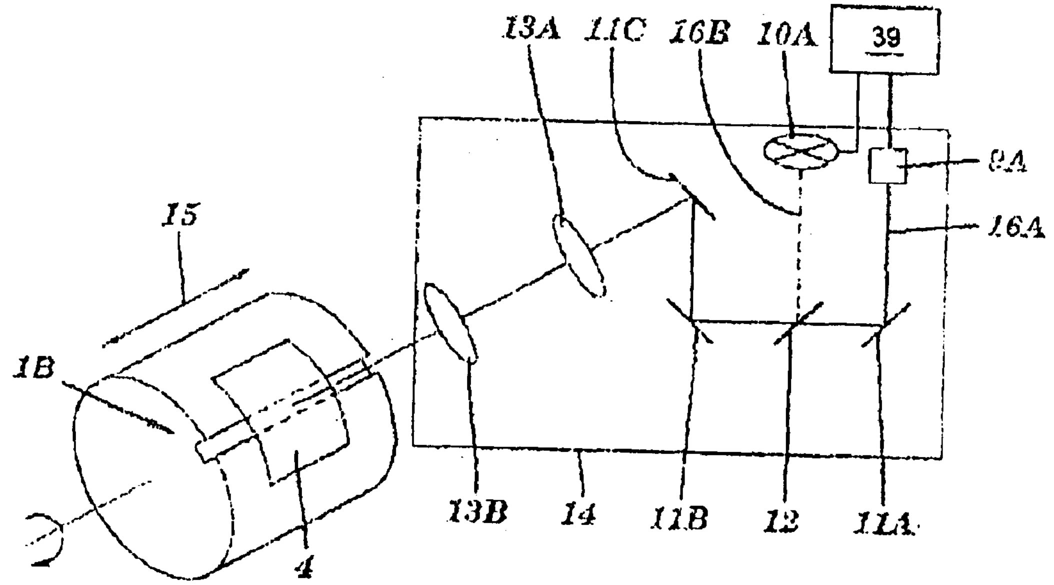
FIG. 4 shows one embodiment of a light source and light detector mounted in a moveable assembly in accordance with the invention.

A spot of light 5, produced by light source 9A depicted in FIG. 4, is shown illuminating a portion of plate 4 that is positioned directly over groove 3A. Light spot 5 from light source 9A is aligned with, and is moved along, groove 3A while drum 1A is held stationary. FIG. 2 illustrates a positional relationship between plate 4, support surface 1B, groove 3A and light spot 5 on a larger scale.

Also shown in FIG. 2 is an anti-reflective layer 6 deposed on an inside surface of groove 3A for minimizing the amount of reflected light when spot 5 illuminates groove 3A. Said anti-reflective layer approximates an infinite optical path length. An infinite optical path is defined as a path that does not reflect light toward a light detector. In contrast, plate 4 reflects a large amount of light.

By increasing the difference in the reflected light between the plate and the surface of the drum, the S/N ratio will be increased thereby preventing "smearing" of the signal and allowing detection of the exact edge of a printing plate.

Anti-reflective layer 6 may include, but is not limited to, black velvet, black paint, black oxide coating, black cloth/plush material, black polymer or any other material that absorbs all, or essentially all of the light from source 9A that is incident upon said anti-reflective layer. Alternatively, anti-reflective layer 6 may be any material having a chromophore (or color) whose peak absorbance wavelength is matched to the wavelength of optic light source 9A so essentially all of the light from source 9A is absorbed.

Figure 3:
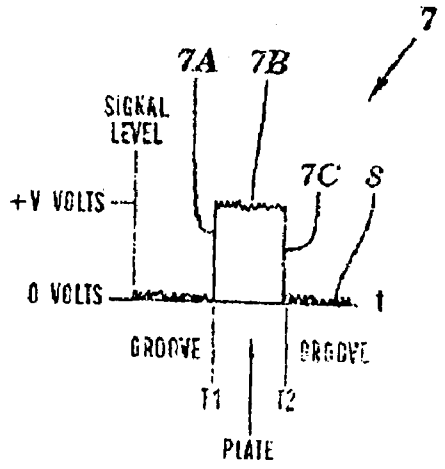
FIG. 3 is a drawing of an electrical signal from a light detector detecting reflected light in accordance with the invention.

FIG. 3 illustrates a signal produced by a light detector (also known as a light sensor) 10A, depicted in FIG. 4, in response to light spot 5 moving across plate 4 and groove 3A while holding the drum stationary. Referring to FIGS. 1–4, when light source 9A and lenses 13A,B produce light spot 5 illuminating plate 4, the light is reflected off plate 4 toward light detector 10A which produces signal 7B in FIG. 3. The light from source 9A is preferably applied generally normal (at about 90 degrees) to plate 4, groove 3A, and support surface 1B. In the preferred embodiment, a light beam is applied at about 7 degrees away from normal (e.g. at ~83 or ~97 degrees to the surface of the drum) as shown by angle 30 in FIG. 2. As light spot 5 moves from the plate, and enters groove 3A, illuminating anti-reflective layer 6, almost all the light is absorbed by anti-reflective layer 6 in accordance with blackbody absorption theory as is well known. Consequently, essentially no light from source 9A is reflected by anti-reflective layer 6 toward detector 10A resulting in signal 8 of FIG. 3 being produced by detector 10A.

The side 7C of the signal illustrated in FIG. 3 corresponds to an exact edge 4A of plate 4. In other words, the change in voltage indicated at T1 or T2 in FIG. 3, represents an edge, e.g. 4A, of plate 4.

The quality, e.g. how "clean" the edge 7C (in addition to signals 7B and 8) is, affects how precisely edge 4A can be defined using signal 7. Groove 3A extends across drum 1A from one end to the other end. As source 9A is scanned along groove 3A, two edges of plate 4 are detected and are shown in FIG. 3 as 7A and 7*c*.

Referring to FIG. 4, operation of one embodiment of a system using the technique described supra will be described. Light source 9A, may be a laser, Light Emitting Diode (LED), incandescent, halogen, fluorescent or any other light source. Source 9A is fixedly mounted integral to a moveable assembly 14, which in turn is mounted proximate to support surface 1B.

Moveable assembly 14 can he moved and controlled in the same manner as optic assemblies used to expose unimaged printing plates or film, as is well known in the art of making platesetters and imagesetters. FIG. 4 shows a controller 39 interfacing with, and controlling assembly 14.

Any wavelength light source may be used with the invention described herein. Use of a light source having a wavelength equal to a wavelength used to transfer an image to a photosensitive plate, e.g. writing on the plate, is also possible. However, the energy used to expose the plate must be different from the energy used to locate an edge of the plate. For example, the fluence or output power used to locate an edge, must be less than the power or fluence required to transfer an image to the plate in order to avoid "burning" an unwanted artifact onto the plate.

Light source 9A provides a beam 16A which need not be coherent or collimated, may be monochromatic or have broadband spectra, and need not be in the visible range of wavelengths to the human eye. Any laser technology would be suitable such as a semiconductor laser, gas laser, dye laser, or solid state rod laser. The only limitations being cost, size, complexity, and power requirements. A single source or a plurality of light sources combined into a single beam producing a single light spot 5 may also be employed. Reflectors 11A–C and beamsplitter 12 are used to facilitate compact packaging and to provide a reference signal 16B to detector 10A (if detector 10A is a quadrant detector), also fixedly mounted integral to moveable assembly 14.

Detector 10A may be a simple photodiode, phototransistor, photomultiplier tube or other light detection means. Light from light source 9A is focused with lenses 13A–B toward, and generally normal to, support surface 1A. Though a plurality of lenses 13A–B and reflectors 11A–B are shown in FIG. 4, any number, or none may be used to practice the invention. Moveable assembly 14 moves across support surface 1B in a transverse direction shown by arrow 15 such that light spot 5 is continuously aligned with groove 3A. This continual alignment between light spot 5 and groove 3A may be accomplished by holding drum 1A stationary while source 9A is moved. Alternatively, moveable assembly 14 may have two degrees of freedom (e.g. the ability to move horizontally and vertically) so as to be able to follow groove 3A while drum 1A rotates.

Light source 9A is preferably amplitude modulated with a sine wave to provide some rejection to background or stray light that may be incident upon the light sensor 10A, 10B. The modulation frequency in the preferred embodiment is approximately 100 KHz at about 80% depth of modulation, but is not limited to this frequency or modulation depth. Light source 9A may alternatively be operated in a continuous wave (CW) mode. Operating light source 9A in pulse mode is possible although synchronization of a light pulse with the alignment of light spot 5 over plate edge 4A is difficult.

Further, as explained infra, precisely knowing the edge 4A of a plate 4 is critical to being able to detect small degrees of skew in a plate. Skew is a condition where a printing plate is mounted in a crooked manner, typically a lateral side being non-parallel to the end of the drum.

Figure 5:
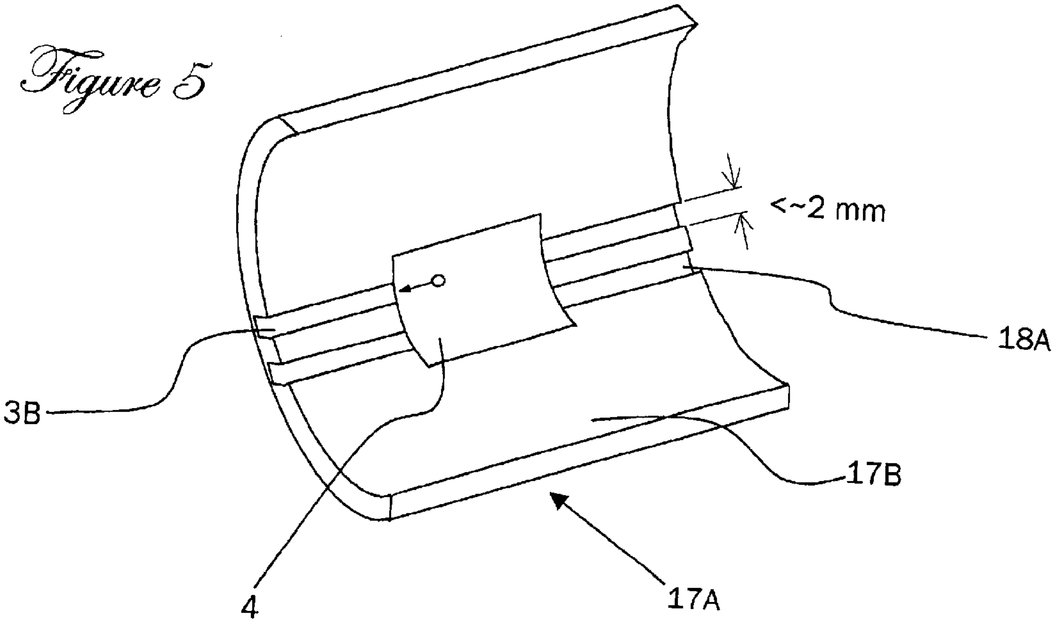
FIG. 5 shows an imageable plate mounted on a portion of an internal drum with a plurality of grooves in accordance with the invention.
Figure 6:
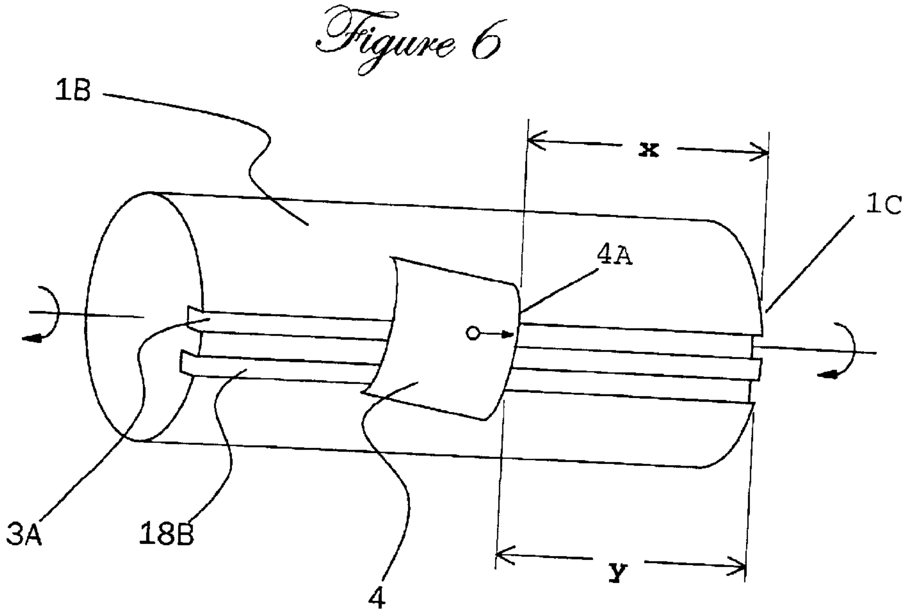
FIG. 6 is an alternate embodiment of an imageable plate mounted on an external drum with a plurality of anti-reflective grooves for detecting a skewed plate.

An alternate embodiment is illustrated in FIG. 5 where support surface 17B is of the internal drum configuration 17A shown with plate 4 mounted on internal drum 17A. Operation of the optical portion of the system and groove is similar as explained in the embodiments of FIGS. 1–4. An additional feature shown in FIG. 5 is a second groove 18A formed into the surface 17B of internal drum 17A. Two or more spatially separated grooves having anti-reflective characteristics allow for detection of a skewed plate 4 mounted on a support surface. FIG. 6, an alternate embodiment of an external drum 1A with two grooves 3A, 18B formed into said drum will be used to describe how a skewed plate is detected. The method to detect a skewed plate is independent of the type of support surface employed. Movable assembly 14 scans light spot 5 from end 1C of drum 1B, across groove 3A, until plate edge 4A is detected as shown by signal 7A in FIG. 3. The time, or alternatively, the distance from end 1C of the drum 1B, along groove 3A, to the edge 4A of plate 4 is recorded as X as shown in FIG. 6. Assembly 14 and drum 1B both move to re-position light spot 5 at said end 1C of drum 1B. Assembly 14 proceeds to scan light spot 5 across groove 18B, until plate edge 4A is again detected as shown by signal 7A in FIG. 3. The time, or alternatively, the distance from the end 1C of drum 1B to edge 4A of plate 4 is recorded as Y as shown in FIG. 6. If X and Y are not equal, then plate 4 is skewed. The direction of the skew can also be determined depending on whether X or Y is larger. The method for detecting a skewed plate is similar when the support surface is internal drum 17A. One difference being internal drums are typically stationary in the art. Consequently, moveable assembly 14 must be able to move spot 5 both laterally and vertically in contrast to external drum systems where rotation of the drum precludes the need for the assembly 14 to move vertically. Further, the order of the steps outlined above for determining a skewed plate or finding an edge of a plate may be performed in other sequences e.g. a plate may be detected and then the groove.

FIG. 7 is an alternate embodiment showing light source 9B and light detector 10B as being co-located in moveable assembly 14, without the use of lenses, reflectors, or beam-splitters. Various configurations may be employed to exploit the invention herein ranging from simple to complex. The multitude of configurations demonstrates the utility and flexibility of the invention. Further, the embodiments described herein have been shown to detect a side edge of a printing plate. In fact, the invention is equally applicable to detecting a leading or trailing (e.g. top or bottom edge) edge, or a plurality of edges, as may be required to suit a particular application.

FIG. 8 shows an embodiment with a plurality of diagonal grooves on an external drum. The techniques and methods described herein are also applicable to the embodiment of FIG. 8. Diagonal grooves may also be used on internal drums in a similar manner.

Figures 9A, 9B, 9C:
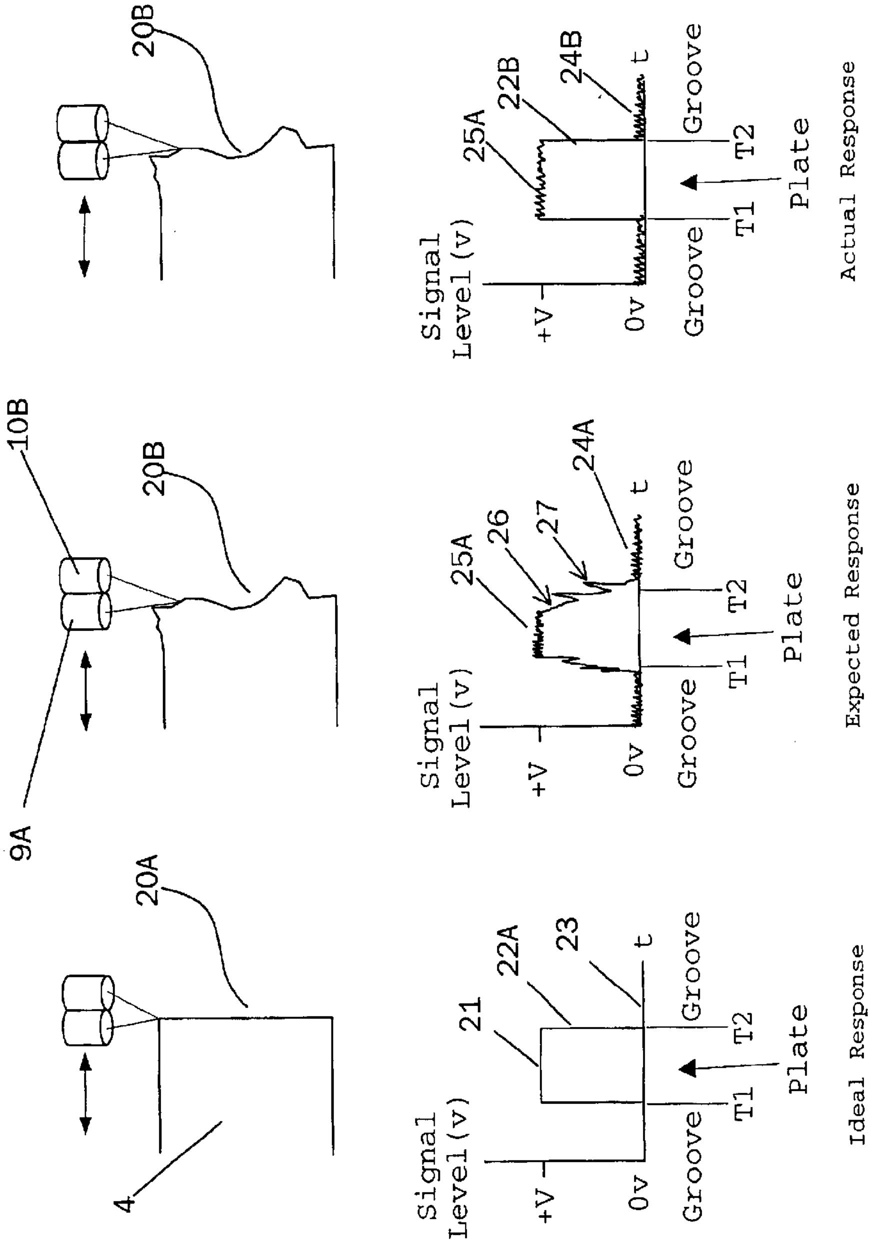
FIGS. 9*a–c* show test results demonstrating utility of the invention for precise edge detection of an imageable plate.

FIGS. 9*a–c* illustrate unexpected test results obtained with the invention herein allowing very precise detection of edge 4A of imageable plate 4. As light source 9A and detector 10B are scanned along groove 3A and plate 4 by moveable assembly 14, an ideal response shown in FIG. 9*a* is desired. The voltage levels 21 and 23 would not contain any noise, and rise and fall times 22A would be zero seconds. Sides or "skirts" 22A of the pulse in FIG. 9*a* would not contain any sharp discontinuities as edge 4A and side 20A of plate 4 would be perfectly orthogonal to the surface of plate 4.

The expected waveform due to mechanical, electrical, optic, and fabrication errors is shown in FIG. 9*b*. Imperfections 20B in the side and edge of plate 4 were predicted to cause multiple reflections resulting in long rise and fall times 26, and sharp discontinuities 27 making the detection of the exact edge of the plate very difficult.

Experiments have shown the results to be better than expected as illustrated in FIG. 9*c*. Of particular interest in FIG. 9*c* is the lack of sharp discontinuities 27 shown in FIG. 9*b*. Without sharp discontinuities 27 in the signal, ambiguity in determining the exact edge 4A of the plate 4 can be avoided.

Figure 10B:
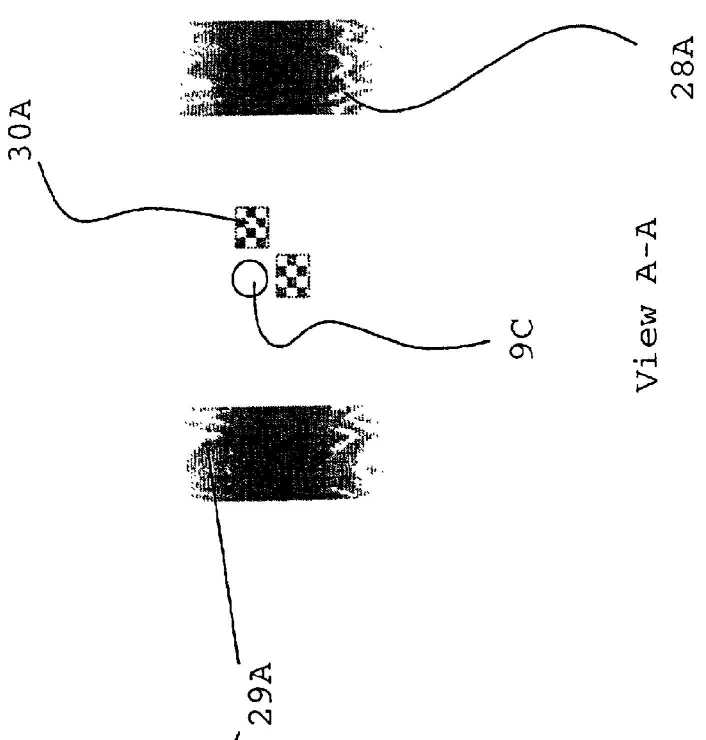
FIGS. 10*a*–10*d* show an alternate embodiment of the groove of FIG. 2 for redirecting light away from a light sensor.
Figure 10A:
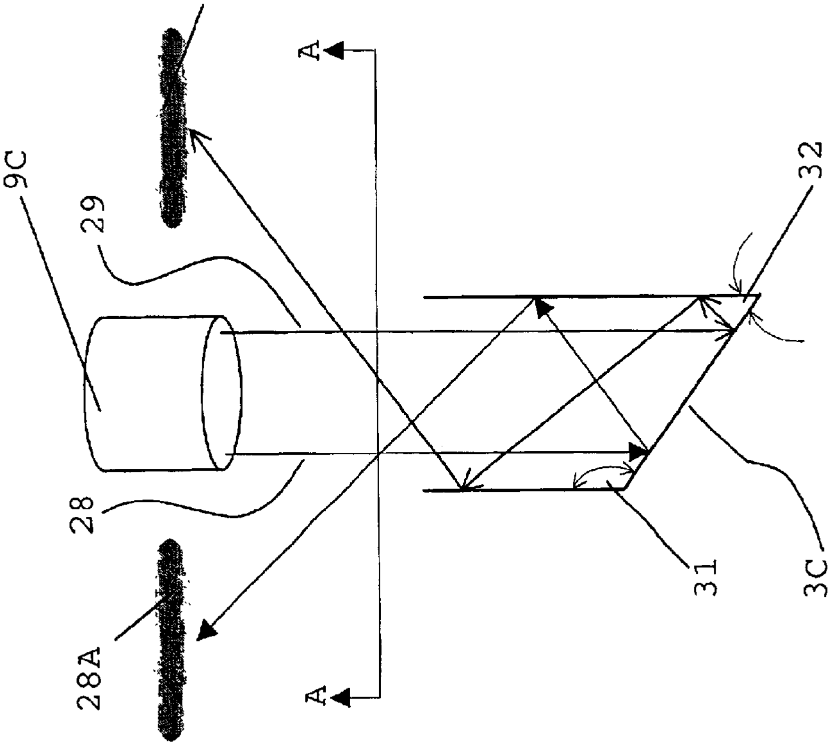
Figures 10C, 10D:
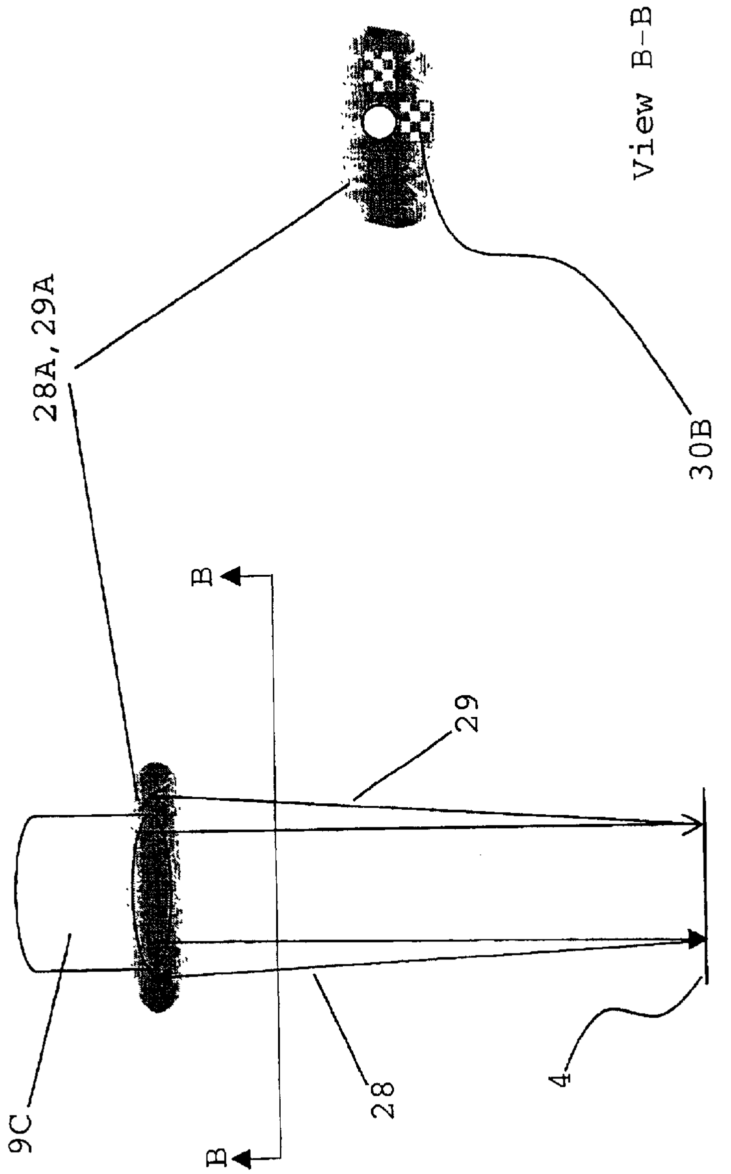

An alternate embodiment of the invention is shown in FIGS. 10*a*–10*d*. FIG. 10*a* is a side view of groove 3A having a bottom surface 3C that is not mutually perpendicular with the two adjacent sides. The angles 31 and 32 are about 120 and 60 degrees respectively from each associated side. The purpose of the sloping bottom surface 3C of groove 3A is to redirect incident light, 28 and 29 originating from light source 9C away from a light sensor (not shown). Light rays 28 and 29 are redirected by the groove creating light patterns 28A and 29A respectively, as shown in FIGS. 10*a,b*. FIG. 10*b* is a view A—A of FIG. 10*a* looking toward light source 9C. Two patterns are created on either side of source 9C due to multiple reflections of light rays 28 and 29 as shown in FIG. 10*a*. A light sensor positioned in areas 30A or 30B as shown in FIGS. 10*b,d* would not detect light from source 9C when source 9C illuminates the groove. However, when source 9C illuminates plate 4 as shown in FIGS. 10*c,d*, a light pattern is created surrounding and encompassing source 9C. Light sensors placed adjacent source 9C, for example in positions 30A or 30B, would now detect light indicating a plate is present. The difference between the previously described embodiments and the embodiment of FIG. 10 is the antireflective material disclosed supra absorbs the incident light, rather than simply redirecting incident light in a desired direction either towards or away from a sensor.

Many variations of the shape of groove 3 are possible that do not depart from the spirit of the invention.

In accordance with the provisions of the patent statutes and jurisprudence, exemplary configurations described above are considered to represent a preferred embodiment of the invention. However, it should be noted that the invention may be practiced in a variety of configurations other than as specifically illustrated and described without departing from its spirit or scope.

We claim:

1. An apparatus for detecting an edge of imageable media mounted on a support surface of an imagesetter or a platesetter, said apparatus comprising:

a moveable assembly comprising:
  a light source radiating light toward said surface; and
  a light detector for detecting light from said light source; and
two grooves formed into said support surface for preventing light from said source from being directed toward said detector;

wherein said support surface is an internal surface or an external surface of a drum; and wherein the two grooves are diagonally formed into said support surface of said drum for detecting a skewed plate, each groove containing an anti-reflective material.

2. A system for detecting an edge of an unimaged printing plate mounted on a platesetter for imaging the printing plate, the system comprising:

an external drum for supporting said unimaged printing plate;
a moveable assembly comprising:
  a light source directing light generally normal to said drum; and
  a light sensor for detecting reflected light originating from said light source; and
two grooves formed into said drum for preventing light from said light source, from being reflected towards said light sensor;
wherein the two grooves are formed diagonally across said drum for detecting a skewed plate, each groove containing an antireflective layer disposed on at least a portion of an inside surface of said grooves.

3. A method for detecting an edge of an imageable plate mounted on an external drum of a platesetter for imaging printing plates, the method comprising:

providing a moveable assembly comprising:
  a light source; and
  a light sensor responsive to light from said light source;
providing a groove formed into an outside surface of the external drum, said groove having an anti-reflective layer disposed on an inside surface of said groove;
illuminating a portion of said groove with light from the light source, said light applied generally normal to said groove;
detecting an absence of said light reflected from said groove; said absence of reflected light from said groove corresponding to a first signal level generated by said light sensor;

moving said light source along said groove;

detecting light reflected from the imageable plate mounted over a portion of said groove in response to said light from said light source illuminating a portion of the plate as said light source passes over the plate;

said reflected light corresponding to a second signal level generated by said light sensor; and said edge of the imageable plate being detected when a difference between said first and said second signal levels exceed a predetermined value.

4. A method of detecting a skewed printing plate mounted on an external drum of a platesetter for imaging printing plates, the method comprising the steps of:

providing a moveable assembly comprising:

a light source; and a light sensor responsive to light from said light source;

positioning said moveable optical assembly at an end of said drum, over a first groove longitudinally formed into said drum;

illuminating a portion of said first groove with a beam of light from said light source, said light beam applied generally normal to said first groove;

detecting an absence of light reflected from said first groove; said reflected light from said first groove corresponding to a first signal level generated by said light sensor;

moving said optical assembly along a path parallel to said first groove while monitoring a first spatial position of said light source;

detecting light reflected from a printing plate mounted over a portion of said first groove in response to said beam of light from said light source illuminating said plate as said light source passes over said plate;

said reflected light from said plate corresponding to a second signal level generated by said light sensor;

recording a first position of said moveable light source when a first difference between said first and said second signal levels exceeds a first predetermined value;

positioning said moveable optical assembly at said end of the drum over a second groove formed into said drum, said second groove formed parallel to said first groove;

illuminating a portion of said second groove with said beam of light from said moveable light source, said light beam applied generally normal to said second groove;

detecting an absence of light reflected from said second groove;

said absence of reflected light from said second groove corresponding to a third signal level generated by said light sensor;

moving said optical assembly along a path parallel to said second groove while monitoring a second spatial position of said light source;

detecting light reflected from said printing plate mounted over a portion of said second groove in response to said beam of light from said light source illuminating said plate as said light source passes over said plate;

said reflected light from said plate corresponding to a fourth signal level generated by said light sensor;

recording a second position of said moveable light source when a second difference between said third and said fourth signal levels exceeds a second predetermined value; and calculating a third difference between said first position and said second position and determining if said third difference exceeds a third predetermined value indicating a skewed printing plate is mounted on said drum.

* * * * *